United States Patent
Xu et al.

(10) Patent No.: US 10,488,193 B2
(45) Date of Patent: Nov. 26, 2019

(54) GRASPING DEVICE AND ALARM METHOD THEREOF

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Hongliang Xu, Beijing (CN); Dong Guo, Beijing (CN); Guozheng Cheng, Beijing (CN); Changrui Liang, Beijing (CN); Hanzhong Zhang, Beijing (CN); Chunlin Zhou, Beijing (CN); Yang Wu, Beijing (CN); Ying Xi, Beijing (CN); Zhong Peng, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/119,049

(22) Filed: Aug. 31, 2018

(65) Prior Publication Data
US 2019/0226844 A1 Jul. 25, 2019

(30) Foreign Application Priority Data
Jan. 22, 2018 (CN) .......................... 2018 1 0057844

(51) Int. Cl.
*G01C 9/06* (2006.01)
*G08B 21/18* (2006.01)
*G02F 1/13* (2006.01)

(52) U.S. Cl.
CPC ............. *G01C 9/06* (2013.01); *G08B 21/182* (2013.01); *G01C 2009/066* (2013.01); *G02F 1/1303* (2013.01)

(58) Field of Classification Search
CPC .. G01C 9/06; G01C 2009/066; G08B 21/182; G02F 1/1303
USPC .......................................................... 340/600
See application file for complete search history.

(56) References Cited

U.S. PATENT DOCUMENTS

| | | | | |
|---|---|---|---|---|
| 9,721,129 | B1* | 8/2017 | Dasarathan | G06K 7/10396 |
| 10,059,006 | B2* | 8/2018 | Rublee | B25J 9/1697 |
| 2005/0055027 | A1* | 3/2005 | Yeung | A61B 17/0401 606/75 |
| 2014/0061989 | A1* | 3/2014 | Zhang | G02F 1/1303 269/37 |
| 2014/0318118 | A1* | 10/2014 | Mazzeo | B25J 9/1075 60/527 |
| 2015/0164526 | A1* | 6/2015 | Bernhardt | B26B 13/12 606/205 |

(Continued)

*Primary Examiner* — Omar Casillashernandez
(74) *Attorney, Agent, or Firm* — Nath, Goldberg & Meyer; Joshua B. Goldberg

(57) ABSTRACT

The present disclosure provides a grasping device and an alarm method thereof. The grasping device includes: a bendable support part; a bend limiting support part that supports the bendable support part and limits bending of the bendable support part in a first direction, but allows bending of the bendable support part in a second direction opposite to the first direction; a plurality of suction members located on a side of the bend limiting support part away from the bendable support part and connected to the bendable support part.

17 Claims, 3 Drawing Sheets

(56) References Cited

U.S. PATENT DOCUMENTS

| | | | |
|---|---|---|---|
| 2015/0257839 A1* | 9/2015 | Vause | A61B 17/22032 |
| | | | 606/130 |
| 2016/0113668 A1* | 4/2016 | Murdeshwar | A61B 17/29 |
| | | | 606/207 |
| 2017/0282379 A1* | 10/2017 | Nakayama | B25J 15/0028 |
| 2018/0361596 A1* | 12/2018 | Beri | B25J 13/08 |
| 2019/0201729 A1* | 7/2019 | Jakobi | A63B 21/00185 |

* cited by examiner

GRASPING DEVICE AND ALARM METHOD THEREOF

CROSS-REFERENCE TO RELATED APPLICATION

This application claims priority from Chinese patent application No. 201810057844.8 filed with the China Patent Office on Jan. 22, 2018, the disclosure of which is incorporated herein by reference in its entirety.

TECHNICAL FIELD

The present disclosure relates to a technical field of manufacturing equipment, and particularly relates to a grasping device and an alarm method thereof.

BACKGROUND

In the actual production of liquid crystal panels, a straight strip-shaped main beam of the existing liquid crystal panel grasping device may be bent after the liquid crystal panel grasping device is operated for a certain period of time, resulting in an incorrect grasping point of the liquid crystal panel grasping device, which in turn causes the grasped display panel to be inclined. During the process of lowering the inclined display panel, corners of the display panel that are inclined tend to be easily pressed and damaged.

SUMMARY

The present disclosure has been accomplished in order to at least partially solve the problems in related art. The present disclosure provides a grasping device capable of reducing a force on a grasped object after the grasped object is subjected to a concentrated pressure, and setting off an alarm when bending of the grasping device exceeds a threshold value, as well as an alarm method thereof.

According to one aspect of the disclosure, there is provided a grasping device, comprising:

a bendable support part;

a bend limiting support part that supports the bendable support part and limits bending of the bendable support part in a first direction, but allows bending of the bendable support part in a second direction opposite to the first direction;

a plurality of suction members located on a side of the bend limiting support part away from the bendable support part and connected to the bendable support part.

In some embodiments, the grasping device may further include:

a level detection part disposed on the bendable support part.

In some embodiments, the level detection part may include a light emitter and a light receiver; and the light emitter and the light receiver are both disposed on a side of the bendable support part away from the bend limiting support part, and are spaced apart from each other.

In some embodiments, there may be a plurality of bendable support parts;

the plurality of bendable support parts include a first bendable support part and a second bendable support part that are spaced apart from each other;

the light receiver includes a first receiver disposed on the first bendable support part, and a second receiver disposed on the second bendable support part;

the light emitter includes a first emitter rotatably disposed on the first bendable support part; and an optical signal emitted by the first emitter rotated to a first angular position is aligned with a signal receiving area of the first receiver, while an optical signal emitted by the first emitter rotated to a second angular position is aligned with a signal receiving area of the second receiver.

In some embodiments, the light emitter may include a second emitter disposed on the second bendable support part; and the second receiver is rotatably disposed on the second bendable support part, an optical signal emitted by the first emitter rotated to the second angular position is aligned with the signal receiving area of the second receiver rotated to a third angular position, and an optical signal emitted by the second emitter is aligned with the signal receiving area of the second receiver rotated to a fourth angular position.

In some embodiments, the second emitter may be rotatably disposed on the second bendable support part;

the first receiver is rotatably disposed on the first bendable support part; and an optical signal emitted by the second emitter rotated to a fifth angular position is aligned with the signal receiving area of the second receiver rotated to the fourth angular position, an optical signal emitted by the second emitter rotated to a sixth angular position is aligned with the signal receiving area of the first receiver rotated to a seventh angular position, and an optical signal emitted by the first emitter rotated to the first angular position is aligned with the signal receiving area of the first receiver rotated to an eighth angular position.

In some embodiments, the grasping device may further include:

an alarm part electrically connected to the light receiver.

In some embodiments, the light receiver may include a reading unit that reads light deviation data; and the alarm part includes:

a data acquisition unit configured to acquire the light deviation data from the reading unit of the light receiver;

a comparison unit configured to compare the light deviation data with a deviation threshold; and an execution unit configured to set off an alarm if the light deviation data is greater than the deviation threshold.

In some embodiments, the bendable support part may include a first rigid support arm and a second rigid support arm, one end of the first rigid support arm being rotatably connected to one end of the second rigid support arm.

In some embodiments, the level detection part may include a light emitter and a light receiver; and the light emitter is disposed on a side of the first rigid support arm away from the bend limiting support part and at the other end of the first rigid support arm, and the light receiver is disposed on a side of the second rigid support arm away from the bend limiting support part and at the other end of the second rigid support arm.

In some embodiments, the bendable support part may include a flexible support arm.

In some embodiments, the grasping device may further include:

a plurality of connecting members via which the plurality of suction members are connected to the bendable support part.

In some embodiments, the connecting member may be a rigid connecting member.

In some embodiments, the bendable support part may be provided with a hole into which one end of the connecting member is inserted, and the other end of the connecting member is connected to the suction member.

In some embodiments, the level detection part may be a bubble level.

According to another aspect of the present disclosure, there is provided an alarm method for the grasping device as mentioned above, the alarm method comprising:

acquiring the light deviation data;

comparing the light deviation data with a deviation threshold; and setting off an alarm if the light deviation data is greater than the deviation threshold.

In some embodiments, the deviation threshold may be an adjustable threshold within the range of −5 mm to 5 mm.

BRIEF DESCRIPTION OF DRAWINGS

Various other advantages and benefits will become apparent to those ordinary skilled in the art from reading the following detailed description of preferred embodiments. The drawings are only for the purpose of illustrating the preferred embodiments and are not to be construed as limiting thereto. Throughout the drawings, the same reference numbers represent the same components. In the drawings.

DETAILED DESCRIPTION

To improve understanding of technical solutions of the present disclosure for those skilled in the art, specific implementations, structures, features and functions of the grasping device and the alarm method thereof provided in the disclosure will now be described in detail in conjunction with accompanying drawings and preferred embodiments. In the following description, specific features, structures, or characteristics in one or more embodiments may be combined in any suitable form.

In the grasping device of the disclosure, a plurality of suction members are respectively supported on a bendable support part. After a portion of an object sucked by the suction member (i.e., a grasped object) is subjected to a concentrated pressure, the bendable support part is bent, thus reducing the stress and capable of setting off an alarm when bending of the bendable support part exceeds a threshold.

Figure 1:
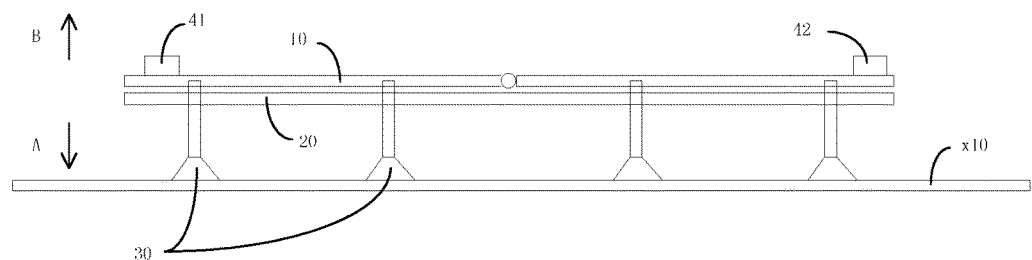
FIG. 1 is a structural schematic view showing a grasping device according to an exemplary embodiment of the disclosure in a first state.
Figure 2:
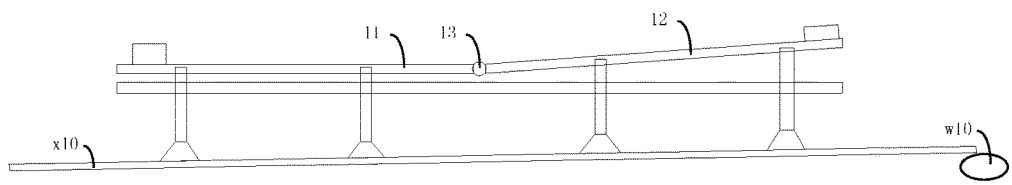
FIG. 2 is a structural schematic view showing a grasping device according to an exemplary embodiment of the disclosure in a second state.

FIG. 1 is a structural schematic view showing a grasping device according to an exemplary embodiment of the disclosure in a first state, and FIG. 2 is a structural schematic view showing a grasping device according to an exemplary embodiment of the disclosure in a second state. As shown in FIGS. 1 and 2, according to one aspect of the disclosure, the grasping device of the disclosure includes a bendable support part 10, a bend limiting support part 20, and a plurality of suction members 30.

The bend limiting support part 20 supports the bendable support part 10 and limits bending of the bendable support part 10 in a first direction A, but allows bending of the bendable support part 10 in a second direction B opposite to the first direction A. The plurality of suction members 30 are located on a side of the bend limiting support part 20 away from the bendable support part 10 and connected to the bendable support part 10. The bendable support part 10 is restricted from being bent in the first direction by the bend limiting support part 20, but bendable in the second direction. After a portion of an object sucked by the suction member 30 is subjected to a concentrated pressure, the bendable support part 10 is bent in the second direction so that a force on the object sucked by the suction member 30 is reduced.

For instance, during lowering of a display panel x10 grasped by the grasping device, the display panel x10 may be inclined due to a destruction to the levelness of the grasping, so that a certain corner of the display panel x10 may first contact a surface to be placed, or touch an outer part w10, and then suffer a relatively greater stress. At this time, a suction member 30 located at the corner under the greater stress transfers the stress to the bendable support part 10 so that the bendable support part 10 is bent in the second direction, thereby reducing damages to the display panel due to the concentrated stress. It will be readily understood that the grasping device is not limited to grasping a display panel, but may grasp any suitable object.

The bendable support part 10 may have a plate shape, a rod shape, or the like. In an exemplary embodiment provided in the present disclosure, the bendable support part 10 includes a first rigid support arm 11 and a second rigid support arm 12, one end of the first rigid support arm 11 being rotatably connected to one end of the second rigid support arm 12. Specifically, one end of the first rigid support arm 11 is rotatably connected to one end of the second rigid support arm 12 via a rotation shaft 13 whose axis is perpendicular to the first direction or the second direction. The first rigid support arm 11 and the second rigid support arm 12 may be made of a metal such as aluminum or steel. Obviously, they are not limited thereto, but may also be made of a non-metal material.

The bend limiting support part 20 may have a plate shape, a rod shape, or the like, and may be made of a metal such as aluminum or steel. The bend limiting support part 20 may be bent after being used for a period of time. Generally, a worker is required to carry a special level to measure the bend limiting support part 20, which is very time consuming. In order to overcome this disadvantage, the present disclosure provides a grasping device which is easier to detect in terms of whether the bend limiting support part 20 is level. In an exemplary embodiment of the disclosure, a level detection part is provided on the bendable support part 10. Since the bendable support part 10 is supported on the bend limiting support part 20, the bend limiting support part 20 restricts the bendable support part 10 from being bent in the first direction. If the bend limiting support part 20 itself is bent, the bendable support part 10 will be inclined with the bend limiting support part 20. By observing a level state of the level detection part on the bendable support part 10, it may determine whether the bend limiting support part 20 is bent.

In some exemplary embodiments of the disclosure, the level detection part may employ a bubble level, which is low in cost and easy to install. In other exemplary embodiments of the disclosure, the level detection part may be a photoelectric detection device. Specifically, the level detection part may include a light emitter 41 and a light receiver 42. The light emitter 41 and the light receiver 42 are both disposed on a side of the bendable support part 10 away from the bend limiting support part 20, and are spaced apart from each other. The light receiver 42 is capable of receiving light emitted by the light emitter 41 when the bendable support part 10 is in a level state. The light emitter 41 may be an infrared emitter. Accordingly, the light receiver 42 may be an infrared receiver. For instance, the infrared emitter is disposed at an end of the first rigid support arm 11 away from the second rigid support arm 12, and the infrared receiver is disposed at an end of the second rigid support arm 12 away from the first rigid support arm 11. If the light receiver 42 receives the light emitted by the light emitter 41, it is determined that the bend limiting support part 20 is not bent. If the light receiver 42 does not receive the light emitted by the light emitter 41, it is determined that the bend limiting support part 20 is bent.

Figure 3:
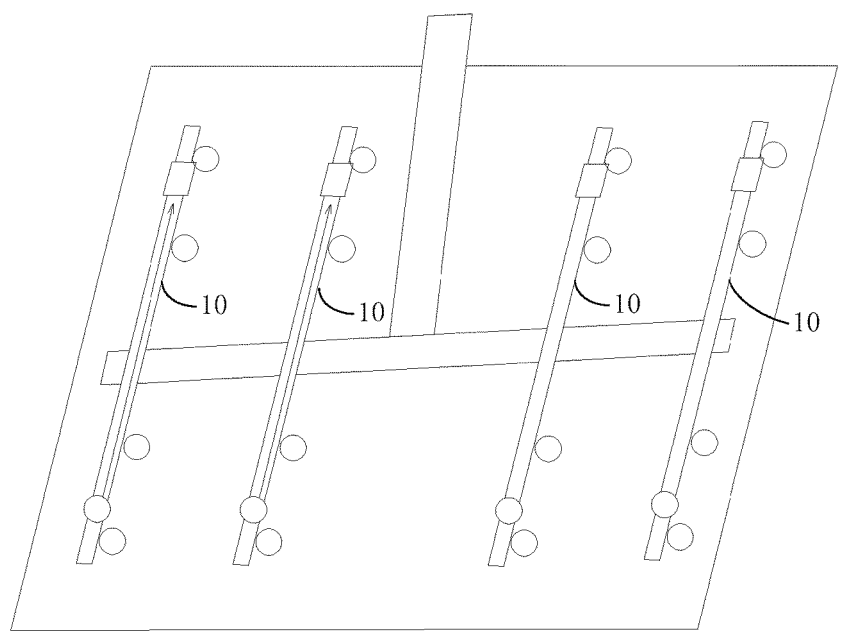
FIG. 3 is a schematic view showing a level detection part of the grasping device according to an exemplary embodiment of the disclosure in a first detection state.
Figure 4:
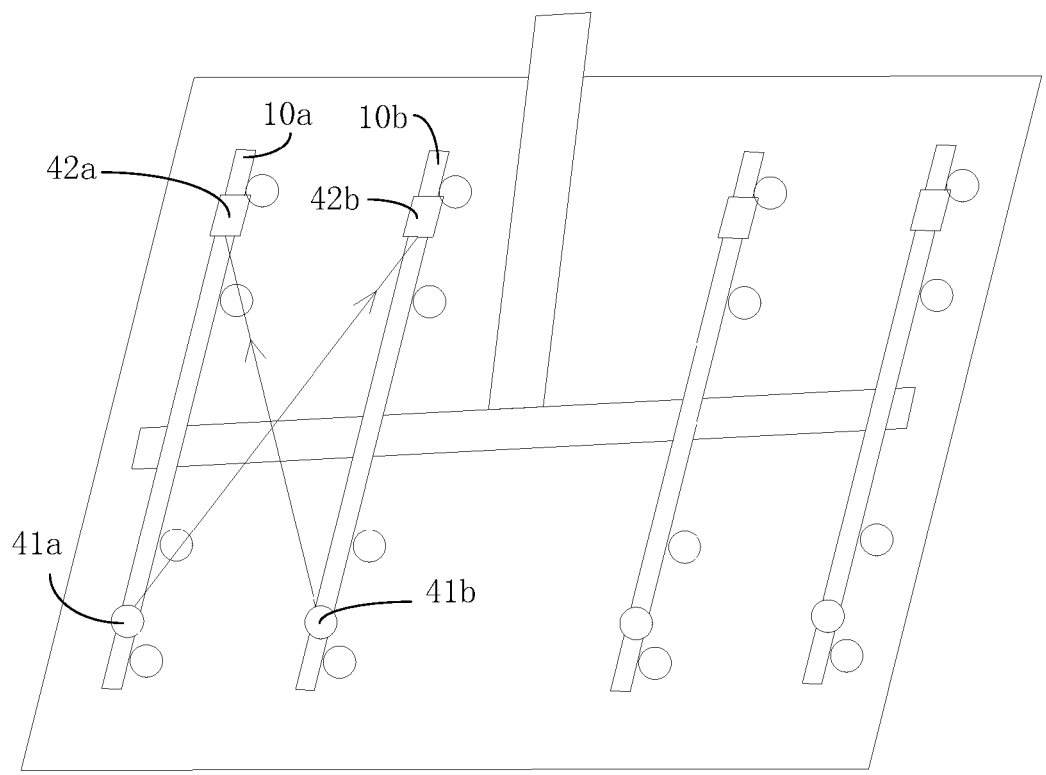
FIG. 4 is a schematic view showing a level detection part of the grasping device according to an exemplary embodiment of the disclosure in a second detection state.

FIG. 3 is a schematic view showing a level detection part of the grasping device according to an exemplary embodiment of the disclosure in a first detection state. FIG. 4 is a schematic view showing a level detection part of the grasping device according to an exemplary embodiment of the disclosure in a second detection state. As shown in FIGS. 3 and 4, the bendable support part 10 provided in an exemplary embodiment of the present disclosure has a strip shape, and there are a plurality of bendable support parts 10. Accordingly, the bend limiting support part 20 also has a strip shape, and each of a plurality of bend limiting support parts 20 supports one of the plurality of bendable support parts 10. The plurality of bendable support parts 10 include a first bendable support part 10a and a second bendable support part 10b that are spaced apart from each other. When the first bendable support part 10a is parallel to the second bendable support part 10b, the suction member 30 disposed on the first bendable support part is lied in the same horizontal plane with and parallel to the suction member 30 disposed on the second bendable support part. Thus, the grasped display panel may be kept level during the grasping process. In the exemplary embodiment, the light receiver 42 includes a first receiver 42a disposed on the first bendable support part 10a, and a second receiver 42b disposed on the second bendable support part 10b. The light emitter 41 includes a first emitter 41a rotatably disposed on the first bendable support part 10a. An optical signal emitted by the first emitter 41a rotated to a first angular position may be aligned with a signal receiving area of the first receiver 42a, and an optical signal emitted by the first emitter 41a rotated to a second angular position may be aligned with a signal receiving area of the second receiver 42b. In the case where the first emitter 41a is rotatable, the first emitter 41a may be aligned with the first receiver 42a and the second receiver 42b in different directions, respectively, so that horizontal lines in two directions may be detected by the same emitter. Moreover, the light emitter 41 includes a second emitter 41b disposed on the second bendable support part 10b. The second receiver 42b is rotatably disposed on the second bendable support part 10b. An optical signal emitted by the first emitter 41a rotated to the second angular position may be aligned with the signal receiving area of the second receiver 42b rotated to a third angular position, and an optical signal emitted by the second emitter 41b may be aligned with the signal receiving area of the second receiver 42b rotated to a fourth angular position. In the case where the second receiver 42b is rotatable, the second receiver 42b may be aligned with the first emitter 41a and the second emitter 41b in different directions, respectively, so that horizontal lines in two directions may be detected by the same receiver. Further, the second emitter 41b is rotatably disposed on the second bendable support part 10b. The first receiver 42a is rotatably disposed on the first bendable support part 10a. An optical signal emitted by the second emitter 41b rotated to a fifth angular position may be aligned with the signal receiving area of the second receiver 42b rotated to the fourth angular position, an optical signal emitted by the second emitter 41b rotated to a sixth angular position may be aligned with the signal receiving area of the first receiver 42a rotated to a seventh angular position, and an optical signal emitted by the first emitter 41a rotated to a first angular position may be aligned with the signal receiving area of the first receiver 42a rotated to an eighth angular position. In the case where the second emitter 41b is rotatable, the second emitter 41b may be aligned with the first receiver 42a and the second receiver 42b in different directions, respectively, so that horizontal lines in two directions may be detected by the same emitter. In the case where the first receiver 42a is rotatable, the first receiver 42a may be aligned with the first emitter 41a and the second emitter 41b in different directions, respectively, so that horizontal lines in two directions may be detected by the same receiver. In other exemplary embodiments of the disclosure, there are three or more bendable support parts 10 that are spaced apart from each other. The light emitter 41 and the light receiver 42 are rotatably disposed at two ends of each of the bendable support parts 10. The light emitter 41 and the light receiver 42 may be rotated 180 degrees to enable light detection by the light emitter 41 and the light receiver 42 on different bendable support parts 10.

During the process of grasping the display panel by the grasping device, the light emitter 41 emits light, while the light receiver 42 receives the light and is electrically connected to an alarm part 50. If the light receiver 42 does not detect the light emitted by the light emitter 41, it is determined that the display panel collides or receives a concentrated stress, and the alarm part 50 sets off an alarm. The alarm part 50 may be an audible and visual alarm, or a display alarm of the controller, which is not specifically limited herein. In the exemplary embodiment, the alarm part 50 may be started and stopped simultaneously with the light emitter 41. After the light emitter 41 stops emitting light, the alarm part 50 does not set off the alarm when the light receiver 42 does not receive the light.

Figure 5:
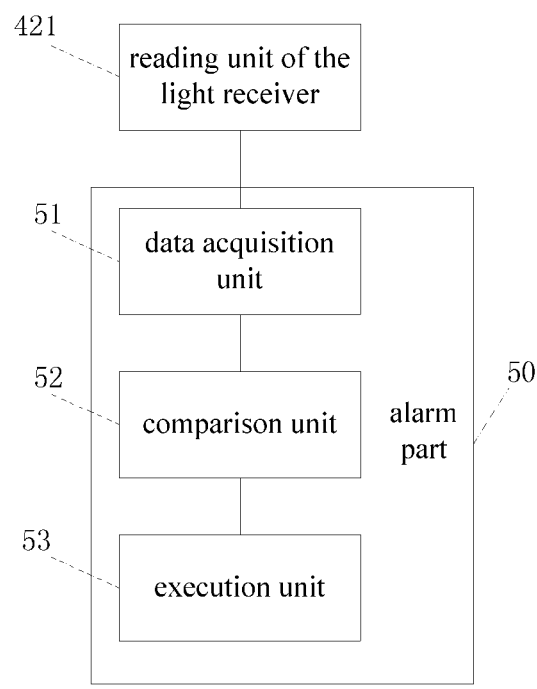
FIG. 5 is a block diagram showing a configuration of an alarm part according to an exemplary embodiment of the disclosure.
Figure 6:
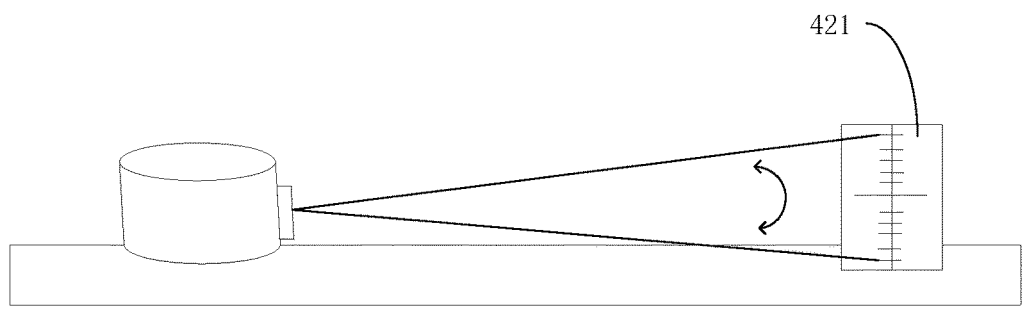
FIG. 6 is a structural schematic view showing an example of a level detection part of the grasping device according to an exemplary embodiment of the disclosure.

FIG. 5 is a block diagram showing a configuration of an alarm part 50 according to an exemplary embodiment of the disclosure. FIG. 6 is a structural schematic view showing an example of a level detection part of the grasping device according to an exemplary embodiment of the disclosure. As shown in FIGS. 5 and 6, the light receiver 42 includes a reading unit 421 that reads light deviation data, and the alarm part 50 includes a data acquisition unit 51, a comparison unit 52, and an execution unit 53. The data acquisition unit 51 is configured to acquire the light deviation data from the reading unit 421 of the light receiver 42. The comparison unit 52 is configured to compare the light deviation data with a deviation threshold. The execution unit 53 is configured to set off an alarm if the light deviation data is greater than the deviation threshold. In an exemplary embodiment of the disclosure, the deviation threshold is an adjustable threshold within the range of −5 mm to 5 mm. In the process of grasping display panels of different sizes, since levelness of the display panels to be controlled are different, the adjustable threshold value may be set according to a size of the grasped display panel. For example, the larger the display panel is, the larger the deviation threshold may be set accordingly. Thus, the grasping device provided in the disclosure may be adapted to grasping display panels of various sizes. In an exemplary embodiment of the present disclosure, the reading unit 421, the acquisition unit 51, the comparison unit 52, and the execution unit 53 discussed above may be implemented by a DSP chip or an embedded chip, respectively. However, the reading unit 421, the acquisition unit 51, the comparison unit 52, and the execution unit 53 of the disclosure are not limited thereto, but may be any other device or circuit capable of implementing a corresponding function, such as a reading circuit, an acquisition circuit, a comparison circuit, an execution circuit, etc.

Other exemplary embodiments of the disclosure differ from the above embodiments in that the bendable support part 10 includes a flexible support arm. The flexible support arm is at least partially made of a flexible material such as a rubber material or a silicone material. In this case, a rotation shaft is not necessary and a buffer protection effect during the grasping of the display panel may still be achieved.

Figure 7:
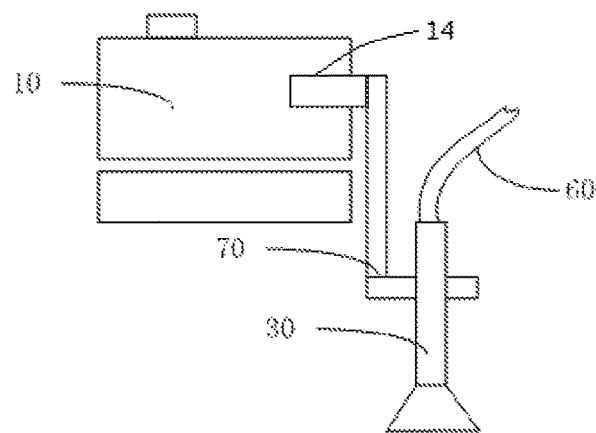
FIG. 7 is a partial structural schematic view showing the grasping device according to an exemplary embodiment of the disclosure.

In some exemplary embodiments, the suction member 30 is a suction cup which is made of a flexible material and has a suction cup surface facing the first direction. When the grasped display panel suffers an impact, the suction cup generates a first-stage buffer protection for the display panel; and if the impact is larger, the bendable support part 10 generates a second-stage buffer protection for the display panel. FIG. 7 is a partial structural schematic view showing the grasping device according to an exemplary embodiment of the disclosure. As shown in FIG. 7, a vacuum suction line 60 is in communication with the suction member 30. In these exemplary embodiments, the grasping device further includes a plurality of connecting members 70 via which the plurality of suction members 30 are connected to the bendable support part 10. More specifically, the bendable support part 10 is provided with a hole 14 into which one end of the connecting member 70 is inserted, and the other end of the connecting member 70 is connected to the suction member 30. In some exemplary embodiments, the bend limiting support part 20 may be provided with a through hole through which at least one of the connecting members passes, and two ends of the connecting member 70 are respectively connected to the suction member 30 and the bendable support part 10. In other exemplary embodiments, at least one of the connecting members 70 may bypass an outer periphery of the bend limiting support part 20 and be connected to the suction member 30 and the bendable support part 10.

In some exemplary embodiments, the connecting member 70 is rigid. For example, it may be a metal connecting rod. Thus, a force received by the suction member 30 may be transferred to the bendable support part 10.

According to another aspect of the disclosure, there is provided an alarm method for the grasping device discussed above. By setting the deviation threshold, display panels of different sizes may have different inclinations while grasped by the grasping device, and an alarm is set off when the inclination exceeds the deviation threshold. Thus, the grasping device provided in the disclosure may be used to grasp display panels of various sizes.

Figure 8:
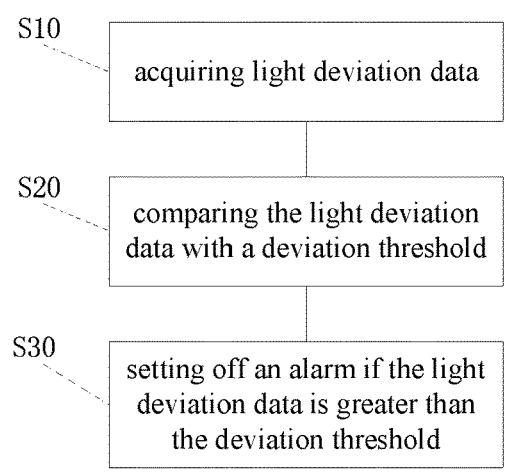
FIG. 8 is a flowchart of an alarm method of the grasping device according to an exemplary embodiment of the disclosure.

FIG. 8 is a flowchart of an alarm method for the grasping device according to an exemplary embodiment of the disclosure. As shown in FIG. 8, the alarm method for the grasping device includes steps S10, S20, and S30.

At step S10, acquiring light deviation data.

When the light emitted by the light emitter 41 deviates from a horizontal direction, the light receiver 42 will monitor a magnitude of the light deviation data.

At step S20, comparing the light deviation data with a deviation threshold.

In the exemplary embodiment, the deviation threshold is an adjustable threshold which may be within the range of −5 mm to 5 mm. However, the adjustable threshold is not limited thereto, and the specific adjustable threshold may be adjusted according to the selected light receivers 42 of different types.

At step S30, setting off an alarm if the light deviation data is greater than the deviation threshold.

In the grasping device and the alarm method thereof provided in an exemplary embodiment of the disclosure, when a partial region of the grasped display panel suffers a greater stress, the suction member 30 will generate a first-stage buffer protection for the display panel, and the bendable support part 10 generates a second-stage buffer protection for the display panel, while an alarm is set off to notify a manager. In this way, the protection and alarm functions are realized, and the yield of the display panel is improved.

In the above described exemplary embodiments, descriptions of the various exemplary embodiments are focused differently, and portions that are not detailed in certain exemplary embodiments may be referred to related descriptions in other exemplary embodiments.

In addition, "first", "second", and the like in the above described exemplary embodiments are used to distinguish respective exemplary embodiments, and do not represent advantages and disadvantages of the respective exemplary embodiments.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A grasping device, comprising:
   a bendable support part;
   a bend limiting support part that supports the bendable support part and limits bending of the bendable support part in a first direction, but allows bending of the bendable support part in a second direction opposite to the first direction;
   a plurality of suction members located on a side of the bend limiting support part away from the bendable support part and connected to the bendable support part.

2. The grasping device according to claim 1, further comprising:
   a level detection part disposed on the bendable support part.

3. The grasping device according to claim 2, wherein
the level detection part comprises a light emitter and a light receiver; and
the light emitter and the light receiver are both disposed on a side of the bendable support part away from the bend limiting support part, and are spaced apart from each other.

4. The grasping device according to claim 3, wherein
there are a plurality of bendable support parts;
the plurality of bendable support parts include a first bendable support part and a second bendable support part that are spaced apart from each other;
the light receiver includes a first receiver disposed on the first bendable support part, and a second receiver disposed on the second bendable support part;
the light emitter includes a first emitter rotatably disposed on the first bendable support part; and
an optical signal emitted by the first emitter rotated to a first angular position is aligned with a signal receiving area of the first receiver, while an optical signal emitted by the first emitter rotated to a second angular position is aligned with a signal receiving area of the second receiver.

5. The grasping device according to claim 4, wherein
the light emitter includes a second emitter disposed on the second bendable support part; and
the second receiver is rotatably disposed on the second bendable support part, an optical signal emitted by the first emitter rotated to the second angular position is aligned with the signal receiving area of the second receiver rotated to a third angular position, and an optical signal emitted by the second emitter is aligned with the signal receiving area of the second receiver rotated to a fourth angular position.

6. The grasping device according to claim 5, wherein
the second emitter is rotatably disposed on the second bendable support part;
the first receiver is rotatably disposed on the first bendable support part; and
an optical signal emitted by the second emitter rotated to a fifth angular position is aligned with the signal receiving area of the second receiver rotated to the fourth angular position, an optical signal emitted by the second emitter rotated to a sixth angular position is aligned with the signal receiving area of the first receiver rotated to a seventh angular position, and an optical signal emitted by the first emitter rotated to the first angular position is aligned with the signal receiving area of the first receiver rotated to an eighth angular position.

7. The grasping device according to claim 3, further comprising:
an alarm part electrically connected to the light receiver.

8. The grasping device according to claim 7, wherein
the light receiver includes a reading unit that reads light deviation data; and
the alarm part includes:
a data acquisition unit configured to acquire the light deviation data from the reading unit of the light receiver;
a comparison unit configured to compare the light deviation data with a deviation threshold; and
an execution unit configured to set off an alarm if the light deviation data is greater than the deviation threshold.

9. The grasping device according to claim 2, wherein
the bendable support part includes a first rigid support arm and a second rigid support arm, one end of the first rigid support arm being rotatably connected to one end of the second rigid support arm.

10. The grasping device according to claim 9, wherein
the level detection part comprises a light emitter and a light receiver; and
the light emitter is disposed on a side of the first rigid support arm away from the bend limiting support part and at the other end of the first rigid support arm, and the light receiver is disposed on a side of the second rigid support arm away from the bend limiting support part and at the other end of the second rigid support arm.

11. The grasping device according to claim 1, wherein
the bendable support part includes a flexible support arm.

12. The grasping device according to claim 1, further comprising:
a plurality of connecting members via which the plurality of suction members are connected to the bendable support part.

13. The grasping device according to claim 12, wherein
the connecting member is a rigid connecting member.

14. The grasping device according to claim 13, wherein
the bendable support part is provided with a hole into which one end of the connecting member is inserted, and the other end of the connecting member is connected to the suction member.

15. The grasping device according to claim 2, wherein
the level detection part is a bubble level.

16. An alarm method for the grasping device according to claim 8, comprising:
acquiring the light deviation data;
comparing the light deviation data with a deviation threshold; and
setting off an alarm if the light deviation data is greater than the deviation threshold.

17. The alarm method according to claim 16, wherein
the deviation threshold is an adjustable threshold within the range of −5 mm to 5 mm.

* * * * *